(12) United States Patent
Vomhof et al.

(10) Patent No.: US 12,460,329 B2
(45) Date of Patent: Nov. 4, 2025

(54) METHOD FOR PRODUCING A COMPOSITE NONWOVEN FABRIC AND DEVICE FOR PRODUCING A COMPOSITE NONWOVEN FABRIC

(71) Applicant: ANDRITZ KUESTERS GMBH, Krefeld (DE)

(72) Inventors: Henning Vomhof, Cologne (DE); Andreas Reiter, Arnsberg (DE); Dennis Latendorf, Krefeld (DE)

(73) Assignee: ANDRITZ KUESTERS GMBH, Krefeld (DE)

( * ) Notice: Subject to any disclaimer, the term of this patent is extended or adjusted under 35 U.S.C. 154(b) by 501 days.

(21) Appl. No.: 17/791,214

(22) PCT Filed: Dec. 8, 2020

(86) PCT No.: PCT/EP2020/085108
§ 371 (c)(1),
(2) Date: Jul. 7, 2022

(87) PCT Pub. No.: WO2021/139945
PCT Pub. Date: Jul. 15, 2021

(65) Prior Publication Data
US 2023/0340709 A1    Oct. 26, 2023

(30) Foreign Application Priority Data

Jan. 10, 2020 (DE) ...................... 10 2020 100 472.9

(51) Int. Cl.
*D04H 1/498* (2012.01)
*D04H 1/4374* (2012.01)
(Continued)

(52) U.S. Cl.
CPC .......... *D04H 1/498* (2013.01); *D04H 1/4374* (2013.01); *D04H 1/492* (2013.01); *D04H 3/11* (2013.01); *D04H 5/03* (2013.01); *D04H 18/04* (2013.01)

(58) Field of Classification Search
CPC ........ D04H 1/498; D04H 5/03; D04H 1/4374; D04H 1/492; D04H 1/732; D04H 3/005;
(Continued)

(56) References Cited

U.S. PATENT DOCUMENTS 3,515,609 A    6/1970  Rudloff
4,376,014 A    3/1983  Bergstrom
(Continued)

FOREIGN PATENT DOCUMENTS

CN    1283092 A    2/2001
CN    1738936 A    2/2006
(Continued)

OTHER PUBLICATIONS

DE 10060050 (Noelle et al); English translation (Doc Pub Jun. 2002) (Year: 2002).*

*Primary Examiner* — Amy Vanatta
(74) *Attorney, Agent, or Firm* — Norman B. Thot

(57) ABSTRACT

A method for producing a composite nonwoven fabric having at least two layers, wherein a first layer is made of long fibers, and a second layer is made of short fibers. The method includes attaching, in a production line, the short fibers of the second layer to the long fibers of the first layer in a wet laid process via a headbox. The headbox has a round flow or cross flow distributor with a rotating or static turbulence generator.

24 Claims, 9 Drawing Sheets

(51) Int. Cl.
*D04H 1/492* (2012.01)
*D04H 3/11* (2012.01)
*D04H 5/03* (2012.01)
*D04H 18/04* (2012.01)

(58) Field of Classification Search
CPC . D04H 3/015; D04H 3/11; D04H 3/16; D04H 18/04; D04H 1/465; D04H 1/48; D04H 1/485; D04H 1/49; D04H 3/147; D04H 5/06; D04H 13/003; D04H 1/495; D04H 1/736
USPC .......................................................... 28/104
See application file for complete search history.

(56) References Cited

U.S. PATENT DOCUMENTS

| | | | | | |
|---|---|---|---|---|---|
| 4,443,297 | A | * | 4/1984 | Cheshire | D21F 11/002 162/190 |
| 5,587,225 | A | * | 12/1996 | Griesbach | D04H 1/49 442/361 |
| 6,022,447 | A | * | 2/2000 | Radwanski | D21H 25/005 28/107 |
| 6,110,848 | A | * | 8/2000 | Bouchette | D04H 1/732 442/389 |
| 6,163,943 | A | * | 12/2000 | Johansson | D04H 1/4374 28/104 |
| 6,592,713 | B2 | * | 7/2003 | Ahoniemi | D04H 3/14 264/479 |
| 2001/0008824 | A1 | | 7/2001 | Rhim et al. | |
| 2002/0166717 | A1 | | 11/2002 | Kubik | |
| 2005/0091811 | A1 | * | 5/2005 | Billgren | D04H 5/02 28/104 |
| 2005/0102801 | A1 | | 5/2005 | Schmidt et al. | |
| 2005/0159065 | A1 | * | 7/2005 | Stralin | D04H 5/03 264/103 |
| 2006/0042049 | A1 | * | 3/2006 | Petersen | D04H 1/732 19/296 |
| 2007/0000107 | A1 | | 1/2007 | Jeambar | |
| 2007/0010156 | A1 | * | 1/2007 | Strandqvist | D04H 3/115 442/415 |
| 2008/0050996 | A1 | * | 2/2008 | Stralin | D04H 3/007 442/327 |
| 2010/0159775 | A1 | * | 6/2010 | Chambers, Jr. | B32B 5/08 28/104 |
| 2011/0083603 | A1 | | 4/2011 | Davydenko et al. | |
| 2012/0325620 | A1 | | 12/2012 | Nakamura et al. | |
| 2014/0090217 | A1 | * | 4/2014 | Jonsson | D04H 1/492 28/103 |
| 2015/0083354 | A1 | | 3/2015 | Strandqvist | |
| 2015/0322606 | A1 | * | 11/2015 | Strålin | D01D 5/0985 264/103 |
| 2015/0330004 | A1 | * | 11/2015 | Strålin | D04H 3/011 428/156 |
| 2018/0112339 | A1 | * | 4/2018 | Weigert | D04H 18/04 |
| 2018/0355527 | A1 | * | 12/2018 | Strandqvist | D21H 27/002 |
| 2019/0177915 | A1 | | 6/2019 | Venema et al. | |
| 2019/0226133 | A1 | * | 7/2019 | Venema | D21H 25/005 |
| 2021/0114341 | A1 | * | 4/2021 | Bogren | B32B 5/26 |
| 2022/0298686 | A1 | * | 9/2022 | Bogren | D04H 1/435 |

FOREIGN PATENT DOCUMENTS

| | | |
|---|---|---|
| CN | 102039253 A | 5/2011 |
| CN | 102535009 A | 7/2012 |
| CN | 104271827 A | 1/2015 |
| CN | 106811866 A | 6/2017 |
| CN | 107438682 A | 12/2017 |
| CN | 107475893 A | 12/2017 |
| CN | 109642395 A | 4/2019 |
| DE | 100 60 050 A1 | 6/2002 |
| DE | 101 13 862 C1 | 8/2002 |
| JP | H08-291453 A | 11/1996 |

\* cited by examiner

METHOD FOR PRODUCING A COMPOSITE NONWOVEN FABRIC AND DEVICE FOR PRODUCING A COMPOSITE NONWOVEN FABRIC

CROSS REFERENCE TO PRIOR APPLICATIONS

This application is a U.S. National Phase application under 35 U.S.C. § 371 of International Application No. PCT/EP2020/085108, filed on Dec. 8, 2020 and which claims benefit to German Patent Application No. 10 2020 100 472.9, filed on Jan. 10, 2020. The International Application was published in German on Jul. 15, 2021 as WO 2021/139945 A1 under PCT Article 21(2).

FIELD

The present invention relates to a method for producing a composite nonwoven fabric with at least two layers, wherein a first layer is made of long fibers and a second layer is made of short fibers. The invention also relates to a device for carrying out such a method.

BACKGROUND

Such composite nonwoven fabrics are used, for example, to produce wet wipes. Such wet wipes are currently used in different fields, for example, as cleansing wipes for babies, toiletries for adults, disinfectant wipes, but also as cleaning wipes for surfaces, vehicles or other products. There are therefore very different requirements not only with regard to the quality, but also to the production costs of such wet wipes. For example, cleansing wipes and toiletries should be particularly soft and of high quality, which means that medium to high production costs are acceptable. The requirements for wet wipes for cleaning are in some cases significantly different, in particular, primarily low production costs.

Various methods and devices for producing composite nonwoven fabrics have previously been described, with the production usually being carried out in a production line with a plurality of devices arranged one behind the other and carrying out the individual work steps. Each layer of fibers is in this case usually successively formed into a fabric or placed on such a fabric and bonded thereto.

In most methods and devices, the second layer to be applied to the first layer is usually produced separately using a former and, in particular, as a pre-dewatered fabric with a dry content of usually more than 30%. This second layer is then placed on the first layer, which is also designed as a fabric and/or made of long fibers, such as "spunbond type" continuous filaments, usually in a dry or air process. Another well-known headbox is the inclined wire headbox. An advantageous broad distribution of the individual short fibers and consequently a particularly high degree of entanglement of the fibers can be achieved with such an inclined wire headbox.

Such inclined wire headboxes are, however, relatively complex and expensive in construction, require a relatively large amount of space, and are therefore relatively expensive to produce, assemble and operate.

It should also be pointed out that in the present case, the long fiber is in particular to be understood as a relatively long fiber compared to the short fiber, in particular an artificial and/or synthetic fiber. Such long fibers can, for example, have a length of between 10 and 150 mm, for example, between 30 and 40 mm. Continuous filaments can alternatively also be provided as long fibers, as in the case of spunbond type threads. The short fiber is in particular to be understood as a relatively short fiber compared to the long fiber. Such short fibers can, for example, have a length of between 0.2 and 9 mm. The second layer can in particular be formed from an aqueous dispersion comprising dispersed natural fibers, recycled fibers such as waste paper, manmade fibers, and mixtures of such fibers. When short fibers are mentioned below, this can also be understood to mean an aqueous dispersion comprising short fibers.

SUMMARY

An aspect of the present invention is to improve the production of a composite nonwoven fabric web in order to eliminate at least one of the disadvantages mentioned above, in particular to reduce the production costs of such a fabric.

In an embodiment, the present invention provides a method for producing a composite nonwoven fabric having at least two layers, wherein a first layer is made of long fibers, and a second layer is made of short fibers. The method includes attaching, in a production line, the short fibers of the second layer to the long fibers of the first layer in a wet laid process via a headbox comprising a round flow or cross flow distributor with a rotating or static turbulence generator so as to provide the composite nonwoven fabric having the at least two layers.

BRIEF DESCRIPTION OF THE DRAWINGS

The present invention is described in greater detail below on the basis of embodiments and of the drawings in which.

DETAILED DESCRIPTION

Figure 1:
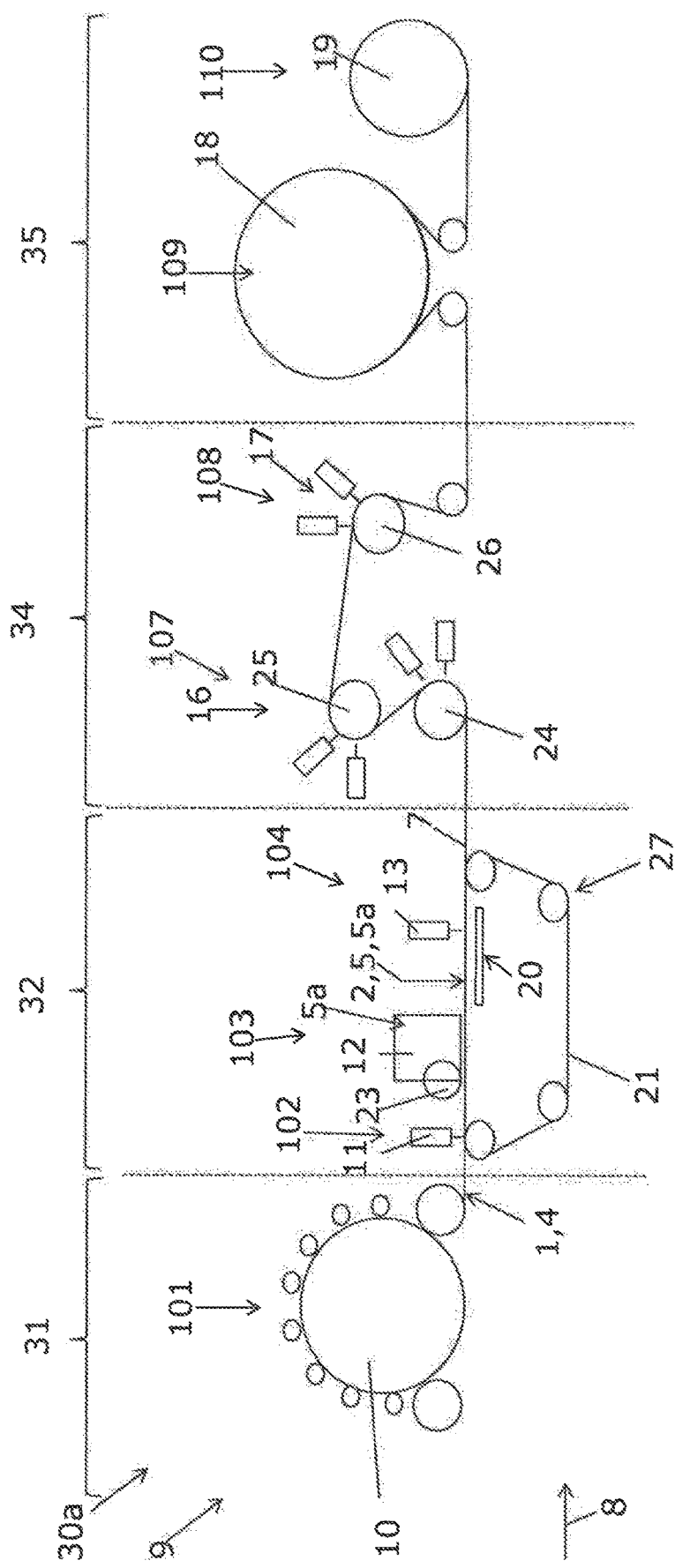
FIG. 1 shows a first embodiment of the device according to the present invention.

The method according to the present invention for producing composite nonwoven fabrics provides that in a production line, the short fibers are applied to the first layer in a wet laid process using a headbox with a round flow or cross flow distributor in combination with a rotating and/or static turbulence generator. Such a headbox can, for example, be a so-called perforated roll headbox. The perforated roll can in particular here form a rotating turbulence generator. The headbox can alternatively comprise a static turbulence generator, in particular a diffuser block. It has surprisingly been shown that, in particular by arranging such a headbox with a rotating or static turbulence generator, in particular a perforated roll headbox, the production of the second layer, in particular the application of a second layer to the first layer, can be carried out in a particularly simple and efficient manner, so that the production of the composite nonwoven fabric can be carried out particularly inexpensively. For this purpose, the headbox with a rotating turbulence generator can in particular be designed as an open headbox. The short fibers to be applied, in particular an aqueous dispersion comprising the short fibers, can be applied to the first layer via an outlet gap, with the first layer being transported, for example, continuously in one conveying direction below the headbox, in particular the perforated roll headbox. A closed headbox, in particular with a static turbulence generator, can alternatively be provided, thereby allowing higher speeds to be run. It has surprisingly been found that a rotating turbulence generator is particularly suitable for use in the method according to the present invention at production speeds of up to 100 m/min, and a static turbulence generator is particularly suitable for production speeds of over 100 m/min. The flow to the headbox can also be from one side. The basis weight of the first layer can be between 10 and 80 g/m². When passing the headbox, the first layer can, for example, be transported on a screen belt, for example, on its surface, so that excess water in the dispersion of the second layer can be removed immediately below and/or downstream of the headbox in the production direction. This can be carried out, for example, by suction. After the second layer has been applied, wet bonding can take place, for example, also on a screen belt or on a cylinder or drum. In the composite nonwoven fabrics produced, it can be provided that the first layer makes up between 20 and 80 percent by weight of the composite material. The second layer can correspondingly also make up between 20 and 80 percent by weight of the composite material.

It has surprisingly been shown that with the method according to the present invention, at least one first layer with a basis weight of between 10 g/m² and 80 g/m² and at least one second layer with a basis weight of between 5 and 100 g/m² can be brought together to form the composite nonwoven fabric over a very wide production speed range of 50 m/min up to 500 m/min, if the lower edge of the outlet gap of the headbox of the wet laid process is between a height level of the screen belt and a height level of up to 150 mm above the screen belt and/or at a delivery angle of −20° to +20° to the direction perpendicular to the surface of the screen belt. By changing the height level and/or the delivery angle, for example, the local region in which the second layer is applied to the first layer, as well as the impulse introduced here in the first layer or the energy introduced here, can be adapted to the respective process conditions and first and second layers so that the composite nonwoven fabric produced using the method according to the present invention has particularly uniform properties. The height level and delivery angle of the wet laid process can in particular be adjusted so that a structural change in the first layer as a result of the impact of the second layer is prevented.

Water from the dispersion can, for example, be additionally suctioned off in the production direction after the wet laid process in order to apply an additional force component to the second layer, which acts towards the first layer. This suction can, for example, take place below the screen belt, for example, using flat suction devices, foil strips or similar suction devices, which can, for example, allow water to be suctioned off uniformly and transversely to the production direction. These suction devices can, for example, be varied with regard to the height level of their suction and the suction angle, in each case relative to the screen belt. These dewatering devices can also be varied in the machine direction with regard to their distance from the headbox. The suction devices can, for example, be designed as gravity dewaterers, in which only gravity acts on the water, or as negative pressure dewaterers which suction off the water with a negative pressure of up to 800 mbar absolute pressure.

The first layer may comprise a single layer of long fibers produced in a single method step.

The first layer can, however, also comprise two or more plies of long fibers which are produced in two or more separate method steps and then bonded to one another. The first layer can, for example, comprise a first ply which is produced via a first carding process and a second ply which is applied to and bonded to the first ply via a second carding process.

The short fibers forming the second layer can likewise be applied to the first layer in a single ply or in two or more plies.

In the wet laid process, the short fibers can, for example, pass through a gap in the headbox. This gap can in particular be at least partially formed or limited by a perforated roll. This allows a particularly simple and broad distribution of the short fibers.

Before the second layer is applied, the first layer can, for example, be produced by unwinding a nonwoven fabric or by a carding process. A particularly high strength of the composite nonwoven material can be achieved as a result. The first layer can in particular be carded immediately before the second layer is applied, in particular online in the same production line. The first layer can consequently in particular represent a carded nonwoven fabric.

If the first layer comprises a plurality of plies, for example, two, each can comprise a carded nonwoven fabric. Each of these plies is then also referred to as carded ("C"). If the composite nonwoven fabric comprises a single second layer, also referred to as pulp ("P"), the composite nonwoven fabric would also be referred to as "CCP."

It is also conceivable and within the scope of the present invention to produce a ply of the first layer by a carding process, i.e., to form it as carded, and to produce a second ply of the first layer by a spunbond process, which is then correspondingly also referred to as "S." Methods for producing composite nonwoven fabrics, for example, of a "CSP," "SCP" or "SSP" type, are therefore also covered by the present invention.

Pre-bonding of the first layer can, for example, take place (in particular immediately) before the application of the second layer. Pre-bonding can be carried out in particular on a screen belt. Pre-bonding is carried out in particular by a water jet. For this purpose, hydrodynamic needling or turbulence known per se for this application, in particular a water nozzle, can be used.

Before the second layer is applied, the short fibers can, for example, be dispersed to form an aqueous dispersion. The dispersion is capable of imparting plastic properties to the fibers over a period of several minutes, thereby optimizing the efficiency of the entanglement by water jet when the dispersion is applied to the first layer.

At least one compacting of the at least two layers can, for example, take place (in particular immediately) after the application of the second layer. Water can in this case in particular be removed from the second layer at the same time, in particular the excess water can be filtered off through the lower layer.

A step for entangling the natural fibers of the second layer can also take place via a water jet device. The entanglement of the fibers can in particular be carried out on a screen belt. A water nozzle known per se for this application can be used therefor.

After the application of the second layer (in particular immediately after compacting), at least one entanglement of the short fibers of the second layer with one another and/or with the long fibers of the first layer can, for example, take place via hydroentanglement, for example, exclusively.

Hydroentanglement can take place when the at least one layer lies on a screen belt or when at least one layer lies against a drum. A first hydroentanglement of the layers can in particular take place when they lie against a screen belt and a downstream second hydroentanglement can take place when they lie against a drum. A water jet known per se for this application can be used therefor and all the hydroentanglement mentioned below.

It has surprisingly been shown that in a further development of the method according to the present invention for producing a composite nonwoven fabric, the first layer of which comprises only one or more C plies and the second layer of which comprises one or more P plies, is also particularly suitable for production speeds of more than 100 m/min and for basis weights of the first layer of 25 g/m$^2$ or less if it comprises the following method steps:

carding and/or pre-bonding of the first layer,
hydration and fixing of the first layer on a screen belt, as well as
bringing the first and second layers together and initial hydrodynamic bonding of the two layers before the two layers are transferred to further method steps. After the application of the second layer (in particular after hydroentanglement), at least one drying and subsequent rolling up of the composite nonwoven fabric obtained can, for example, take place.

The first layer can, for example, form a bottom layer and the second layer can, for example, form a top layer, or the second layer can, for example, form a middle layer and the first layer can, for example, form a top layer and a bottom layer, respectively. In the last-mentioned embodiment, the second layer, i.e., the short fibers, is in particular arranged between the two first layers, i.e., the long fibers. It should here be clear that the upper layer and the lower layer must not necessarily be of the same type, they do not in particular have to be the same layer at an earlier stage. The upper first layer and the lower first layer can rather be constructed differently and, in particular, can be produced separately.

The long fibers can be selected from the group of artificial and/or synthetic fibers, in particular viscose, polyester, polypropylene, polyamide, polyacrylic, polyvinyl alcohol and polyethylene fibers as such or as a mixture. Natural fibers can also be used, for example, selected from the group of cotton, hemp, flax, jute or bamboo fibers, as such or as a mixture, also with those from the group of artificial and/or synthetic fibers. Fibers made of biopolymers, for example, polyactide or polyhydroxybutyrate, can also be used as such or as a mixture, also with those from the group of artificial and/or synthetic fibers and/or natural fibers.

The concentration of short fibers in the headbox with rotating or static turbulence generator can, for example, be between 0.5 and 10 grams/liter.

Pre-bonding of the first layer, the wet laid process of the second layer, and compression of the at least two layers on a common, first screen belt, followed by hydroentanglement can, for example, take place (in a first embodiment of the invention exclusively) when the layers lie against a drum.

In a further embodiment of the present invention, pre-bonding of the first layer, the wet laid process of the second layer and compression of the at least two layers on a first screen belt, followed by a first hydroentanglement take place when the layers lie on the first screen belt or on a separately formed screen belt, and a second hydroentanglement takes place when the layers lie against a drum. In the last-mentioned embodiment, in which the first hydroentanglement takes place on the separately formed second screen belt and the second hydroentanglement on a drum, there is in particular an advantage in the technical decoupling of the wet laid process from the hydroentanglement process. The characteristics of forming and hydroentanglement fabrics can, for example, differ significantly. By separating these two steps, the process can be made more energy-efficient, in particular with less water and fiber losses, and can be controlled more precisely. The separation of the water circuits, in particular the forming region and hydroentanglement, in particular makes it possible to operate the individual circuits individually, depending on requirements.

In a further embodiment of the present invention, in particular for the production of a three-layer composite nonwoven fabric, after the second layer has been applied to the first layer, in particular after both layers have been compressed and in particular before hydroentanglement, an additional first layer is applied to the second layer via an additional carding, or unwinding a roll fabric. The second carding unit or unwinding device required for this purpose is integrated into the production line. The second first layer can as a result in particular be applied continuously to the layers that have already been produced. It is thereby possible to produce composite nonwoven fabrics, for example with a CPC, SPC or SPS structure.

An alternative to be mentioned is an embodiment of the method according to the present invention in which the first layer is produced by a carding process, i.e., is designed as a C-layer. The C-layer can consist of bicomponent fibers or comprise bicomponent fibers. Bicomponent fibers are fibers in which at least one component has thermoplastic properties. The C-layer can also consist of single-component fibers, at least some of which have thermoplastic properties.

The carding process can, for example, comprise a method step of through air bonding before the second layer is applied to the first layer in a further method step. During through air bonding, the fibers of the first layer are subjected to heated air so that the fibers fuse/stick together at least partially in regions where they are in contact with one another.

The further method step can, for example, comprise hydroentanglement for compacting and/or bonding the second layer to the first layer.

The method steps of carding, in particular through air bonding, as well as compacting and bonding, in particular hydroentanglement, can take place inline, i.e., in a common production line.

It is, however, also possible to carry out the two aforementioned method steps offline, i.e., in separate production lines. In this case, the first layer can be produced, for example, via through air bonding, rolled up, transported and then unwound for the application of the second layer. With this method, it is in particular possible to produce particularly thick and highly absorbent, two-layer composite nonwoven fabrics which are particularly suitable for producing toiletries.

The device according to the present invention for producing a composite nonwoven fabric is characterized in that in a production line, at least one conveyor for transporting at least the first layer in a conveying direction and a headbox arranged above this conveyor with a rotating and/or static turbulence generator, in particular a perforated roll headbox or headbox with diffuser block, for applying the short fibers or dispersion of short fibers to the first layer for producing the second layer are arranged in a production line. By arranging such a headbox, the production costs of such a fabric can in particular be significantly reduced. A relatively space-saving apparatus can in particular be provided that is relatively inexpensive both in terms of production and assembly as well as in operation. By arranging the headbox above the conveyor, liquid can be removed from the second layer directly below the headbox, in particular dewatered by the carded and pre-bonded long-fiber layer, and thereby returned to the headbox in a particularly effective manner in a circuit. The conveyor is in particular designed so that the composite nonwoven fabric can be transported from the beginning of the production line to the end of the production line. The device can comprise a plurality of conveying capacities therefor, such as conveyor belts, drive rollers, deflection rollers, embossing rollers and/or drums. The conveyor in question, above which the headbox is arranged, can be designed, for example, as a screen belt.

One or more carding units, for example, with a rotating or static turbulence generator, can, for example, be arranged in the conveying direction upstream and/or downstream of the headbox for producing the first layer. The first layer can thereby be in particular designed as a carded nonwoven fabric.

The conveyor can, for example, comprise a first screen belt, with the headbox, for example, being arranged above the first screen belt. The first screen belt can in particular be designed as a forming screen. The first screen belt is in particular used for a particularly effective dewatering of the suspension through the screen support. The overall water management of the apparatus can also thereby be improved and consequently the costs associated with operating the apparatus reduced.

A portion of the first screen belt can, for example, extend both below the headbox and below at least one hydroentanglement device.

In an embodiment of the device according to the present invention, which is in particular suitable for producing a composite nonwoven fabric, the first layer of which comprises only one or more C-layers and the second layer of which comprises one or more P-layers, as well as for production speeds of more than 100 m/min and for basis weights of the first layer of 25 g/m$^2$ or greater, a first screen belt can, for example, be provided downstream of the headbox in the conveying direction, on which the first layer is pre-bonded, hydrated and fixed. Behind this, in the production direction, a second screen belt is provided, on which the first and second layers are brought together and both layers are initially hydrodynamically bonded before the two layers are transferred to further method steps.

In a further embodiment of the present invention, downstream of the headbox in the conveying direction, there is a second water jet device for compacting at least the first and second layers, a first hydroentanglement device for entangling the short fibers of the second layer and/or a second hydroentanglement device for entangling the short fibers of the second layer arranged with the long fibers of the first layer. The second water jet device for compacting the layers can, for example, be arranged above a first conveyor for transporting the fabric, such as the first screen belt, and the first hydroentanglement device can, for example, be arranged above a separate second conveyor for transporting the fabric, such as a second screen belt. This in particular allows a decoupling of the formation of the layers and their hydroentanglement, so that in particular both parts of the apparatus can be controlled separately and thus more precisely and consequently operated more efficiently.

The headbox can, for example, comprise a turbulence generator in the form of perforated rolls or diffusers. In an alternative embodiment, such a turbulence generator is not provided.

Four embodiments of the present invention are explained in greater detail below with reference to the drawings. Like reference signs thereby denote like components.

Figure 2:
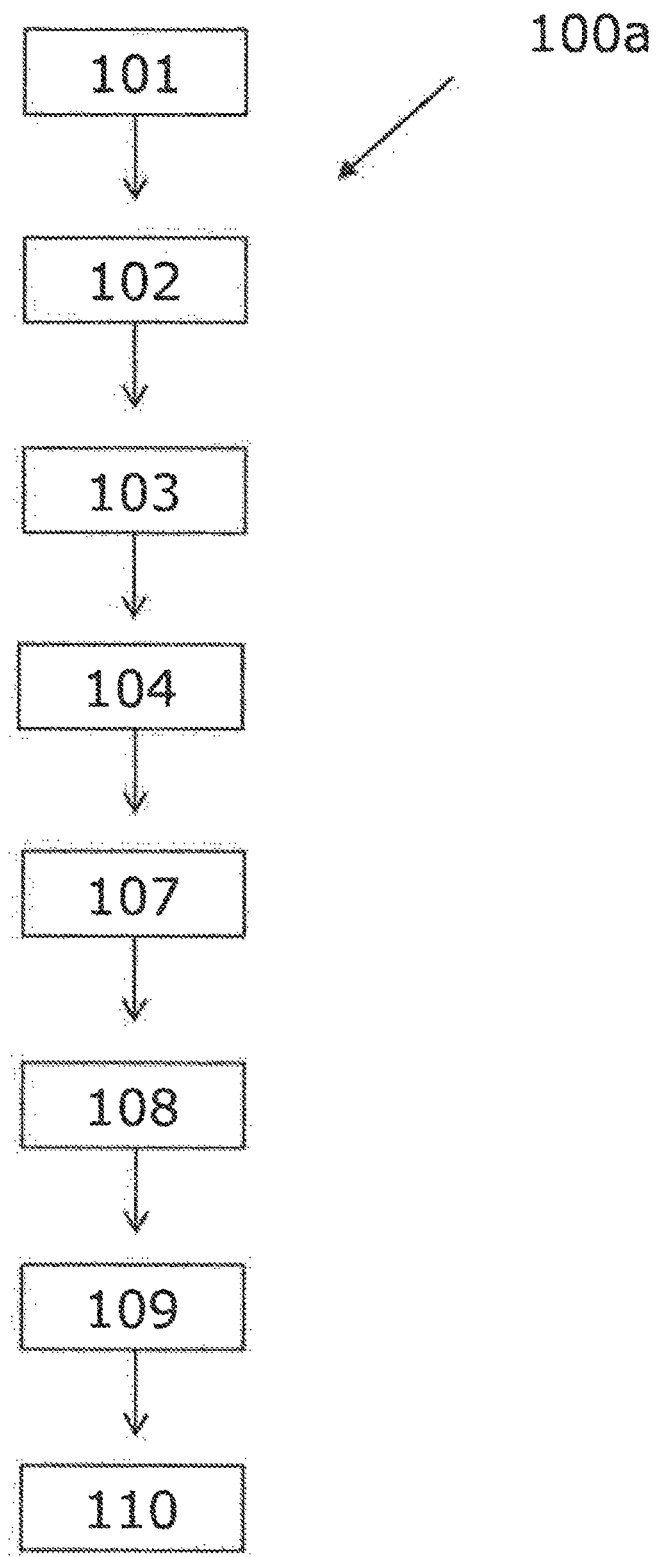
FIG. 2 shows a flowchart of a first embodiment of the method according to the present invention with the device according to FIG. 1.
Figure 3:
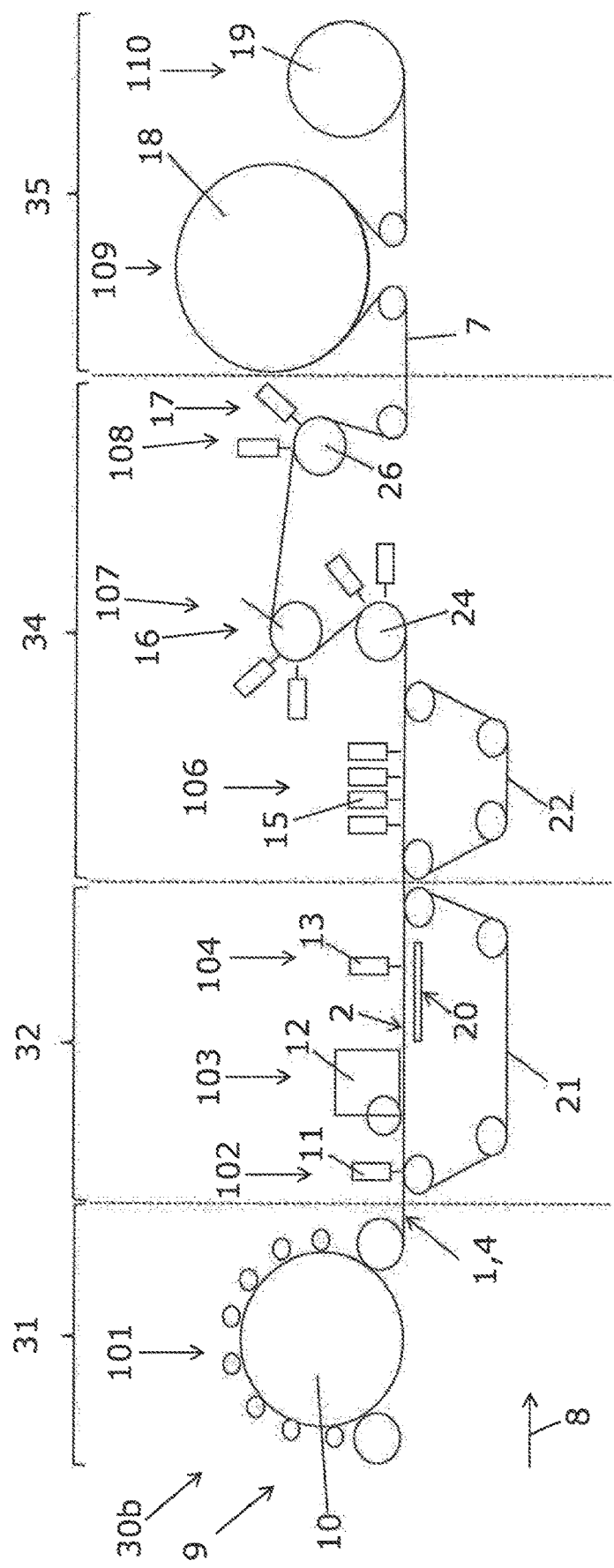
FIG. 3 shows a second embodiment of the device according to the present invention.
Figure 4:
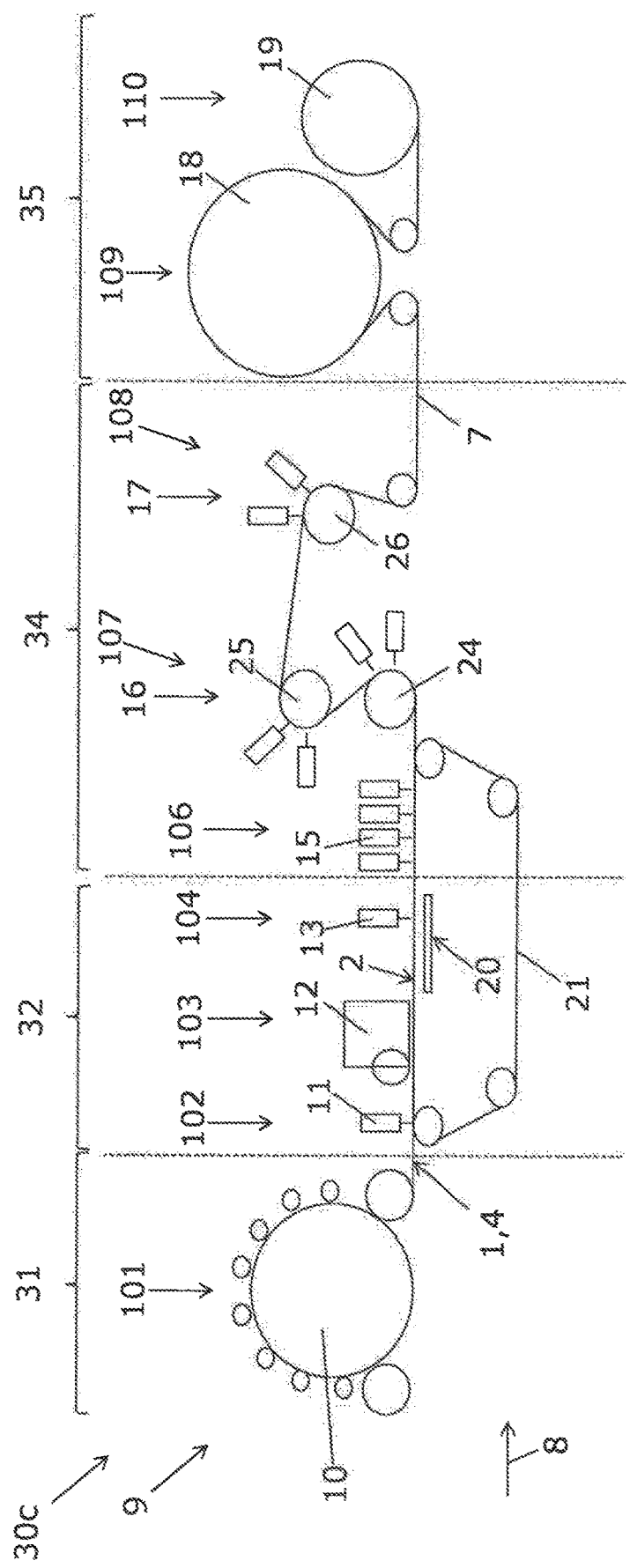
FIG. 4 shows a third embodiment of the device according to the present invention.
Figure 5:
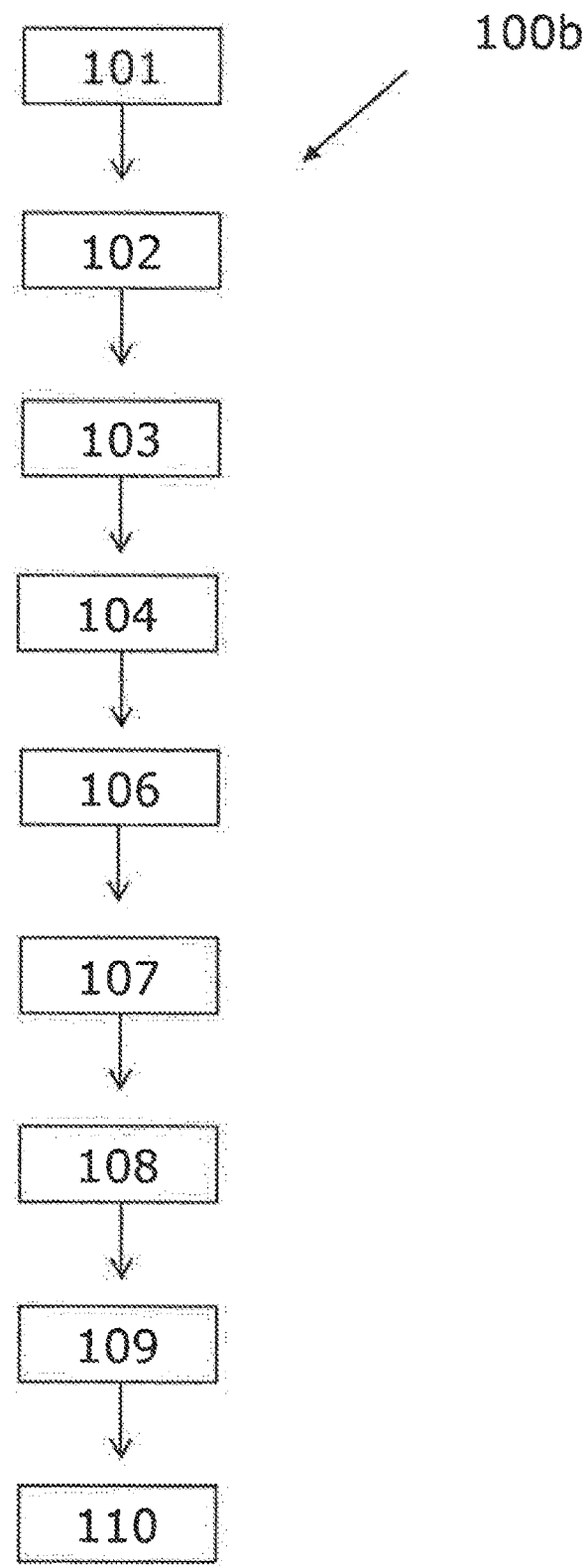
FIG. 5 shows a flowchart of a second embodiment of the method according to the present invention with the device according to FIG. 3 or 4.
Figure 6:
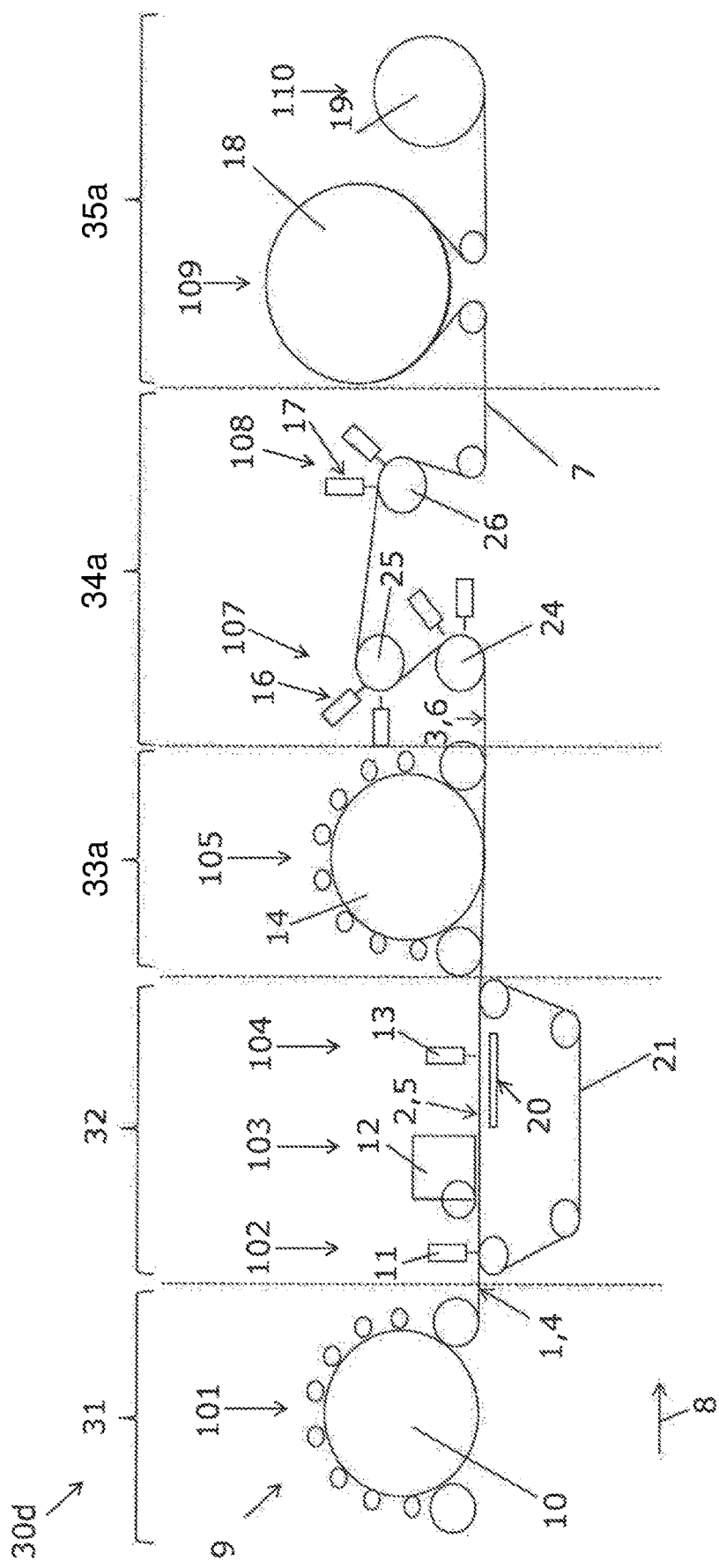
FIG. 6 shows a fourth embodiment of the device according to the present invention.
Figure 7:
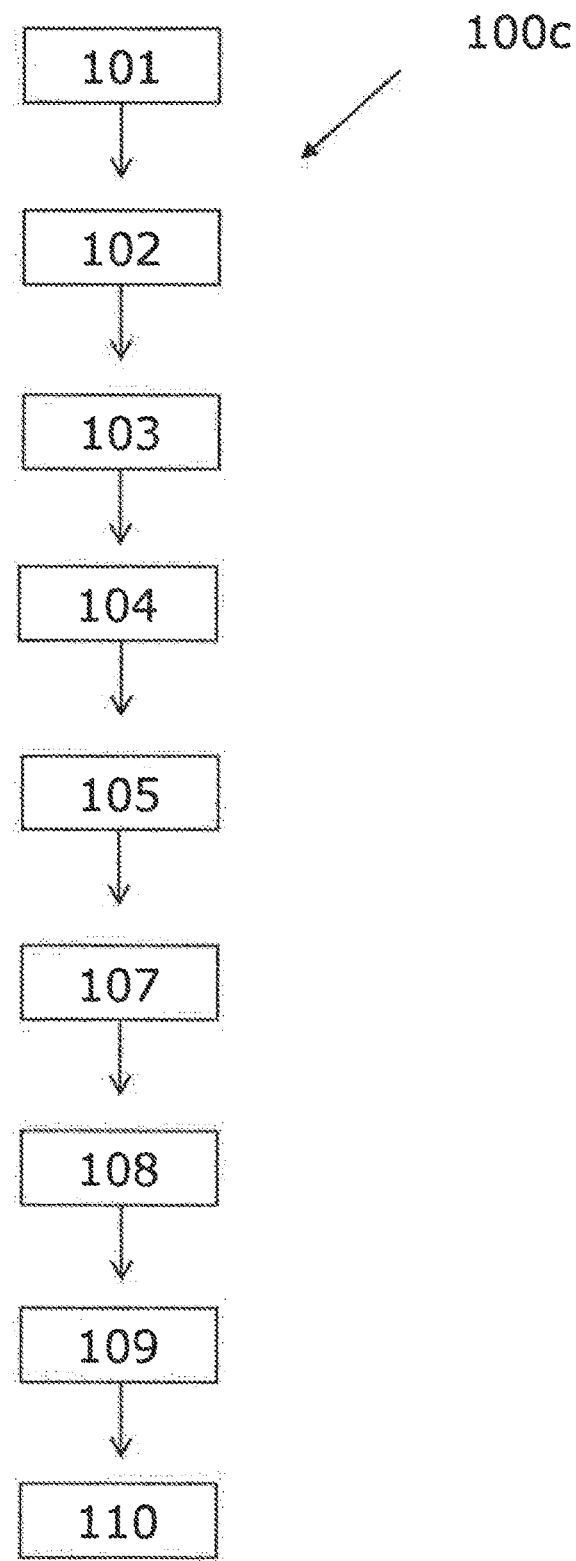
FIG. 7 shows a flowchart of a third method according to the present invention with the device according to FIG. 6.

The devices 30*a*, 30*b*, 30*c* and 30*d* shown in FIGS. 1, 3, 4 and 6 and the methods 100*a*, 100*b*, 100*c* shown in FIGS. 2, 5 and 7 serve in particular to produce a composite nonwoven fabric 7 with at least two layers 1, 2, 3, wherein a first layer 1, 3 is made of long fibers 4, 6 and a second layer 2 is made of short fibers 5.

FIG. 1 shows a first embodiment of the device 30*a* according to the present invention with which a first embodiment of the method 100*a* according to the present invention shown in FIG. 2 can be carried out.

The device 30*a* comprises a production line 9 which, viewed in a conveying direction 8, has a first region 31 for forming the first layer 1, a second region 32 for forming the second layer 2, a third region 34 for bonding the two layers 1, 2, and a fourth region 35 for finishing the fabric 7. The fabric 7 is transported from the first region 31 to the fourth region 35 via a conveyor 27, which is not shown in full.

A first carding unit 10 for producing, in particular carding 101, the first layer 1 is provided in the first region 31.

The second region 32 comprises a pre-bonding unit 11, a headbox 12 with a rotating or static turbulence generator, in particular a perforated roll headbox, and a compression unit 13. A circulating first screen belt 21 for transporting the fabric 7 and a water absorption point 20 are arranged in this second region 32 as part of the conveyor 27.

In the present case, the pre-bonding unit 11 comprises a first water jet device for pre-bonding 102 the first layer 1.

In the present case, the headbox 12 comprises a cross flow or round flow distributor 23 and a unit providing the short fibers 5 or an aqueous dispersion 5*a* comprising the short fibers 5, such as a storage tank. The headbox 12 is used to apply 103 the second layer 2 to the first layer 1, also referred to as wet laying.

In the present case, the compression unit 13 comprises a second water jet device for compressing 104 at least the applied second layer 2. Below the pre-bonding unit 11, the headbox 12 and/or the compression unit 13, the water absorption point 20 for at least partially dewatering the second layer 2 applied to the first layer 1 is arranged.

A bonding unit 16, in particular a second hydroentanglement device for hydroentanglement 107 of the two layers 1, 2, is arranged in the third region 34. Hydroentanglement 107 takes place in particular on both flat sides of the fabric 7. For this purpose, the fabric 7 runs around a first drum 24 and a second drum 25. A finishing unit 17 is also arranged in the third region 34, in particular a further third hydroentanglement device for one-sided forming or embossing 108 of the fabric 7. A third drum 26 is provided for this purpose.

In the fourth region 35, the fabric 7 is dried 109 via a drying drum 18 and the fabric 7 is rolled up 110 onto a winding roll 19.

FIG. 3 shows a second embodiment of the device 30*b* according to the present invention and FIG. 4 shows a third embodiment of the device 30*c* according to the present invention, wherein a second embodiment of the method 100*b* shown in FIG. 5 can be carried out with both devices 30*b*, 30*c*.

The device 30*b*, 30*c* in turn comprises a production line 9 which, viewed in a conveying direction 8, has a first region 31 for forming the first layer 1, a second region 32 for forming the second layer 2, a third region 34 for bonding the two layers 1, 2, and a fourth region 35 for finishing the fabric 7. The fabric 7 is transported from the first region 31 to the fourth region 35 via a conveyor 27, which is not shown in full. The devices 30*b*, 30*c* differ in particular in the arrangement and design of the conveyor in the second and third regions 32, 34.

A carding unit 10 for producing, in particular carding 101, the first layer 1 is provided in the first region 31 of the devices 30*b*, 30*c*.

The second region 32 comprises a pre-bonding unit 11, a headbox 12 with a rotating or static turbulence generator, and a compression unit 13. In the present case, the pre-bonding unit 11 comprises a first water jet device for pre-bonding 102 the first layer 1. In the present case, the headbox 12 comprises a cross flow or round flow distributor 23 and a unit providing the short fibers 5 or an aqueous dispersion 5*a* comprising the short fibers 5, such as a storage tank. The headbox 12 is used to apply 103 the second layer 2 to the first layer 1. The compression unit 13 comprises a second water jet device for compressing 104 at least the applied second layer 2.

A first bonding unit 15, in particular a first hydroentanglement device for hydroentanglement 106 in particular of the second layer 2, and a second bonding unit 16, in particular a second hydroentanglement device for hydroentanglement 107 of the two layers 1, 2, are arranged in the third region 34. Hydroentanglement takes place in particular exclusively on the upper flat sides of the fabric 7, i.e., exclusively on the second layer 2. The fabric 7 lies on a conveyor 27 therefor. Hydroentanglement 107 takes place on the flat sides of the fabric 7. The fabric 7 runs around a first drum 24 and a second drum 25 therefor. A forming unit 17 is also arranged in the third region 34, in particular a third hydroentanglement device for one-sided forming or embossing 108 of the fabric 7. A third drum 26 is provided for this purpose.

In the device 30*b* shown in FIG. 3, a first screen belt 21 is arranged as part of the conveyor 27 for transporting the fabric 7 in the second region 32 and a separately formed second screen belt 22 is arranged in the third region 34. The first screen belt 21 transports the fabric 7 to behind the compression unit 13. In the region of the first screen belt 21, the steps of pre-bonding 102, wet laying 103 and compression 104 again take place. The second screen belt 22, which takes over the fabric 7 after compression 104, transports the fabric 7 exclusively in the region of the first bonding device 15. In the region of the second screen belt 22, therefore, only the step of hydroentanglement 106 takes place. This separation of the two conveying portions in the region of the first screen belt 21 and the second screen belt 22 allows for a particularly precise control and regulation of the apparatus, in particular when using a headbox 12 with a rotating or static turbulence generator, in particular with regard to the removal of water from the second layer 2, as well as a particularly efficient operation caused thereby.

In contrast, in the device 30*c* shown in FIG. 4, a first screen belt 21 is provided which extends over the second region 32 and also in part over the third region 34, in particular also under the first bonding device 15. A separately formed second screen belt 22 is in particular not provided in this device 30*c*. In this embodiment, there are advantages with regard to the production and operating costs, in particular from the smaller number of components, in particular the drive and control components, relative to the device 30*b*.

Both devices 30*b* and 30*c* have in common the fourth region 35 in which drying 109 of the fabric 7 takes place via a drying drum 18 and winding up 110 of the fabric 7 takes place onto a winding roll 19.

FIG. 6 shows a fourth embodiment of the device 30*d* according to the present invention, with which a third embodiment, shown in FIG. 7, of the method 100*c* according to the present invention can be carried out.

The device 30*d* comprises a production line 9 which, viewed in a conveying direction 8, has a first region 31 for forming the first layer 1, a second region 32 for forming the second layer 2, a third region 33*a* for forming an additional second first layer 3, a fourth region 34*a* for bonding the three layers 1, 2, 3 and a fifth region 35*a* for finishing the fabric 7. The fabric 7 is transported from the first region 31 to the fifth region 35*a* via a conveyor 27, which is not shown in full. The device 30*d* differs from the device 30*a* shown in FIG. 1 in particular in the arrangement of a further carding unit 14 for carding 105 a further layer 3.

In the first region 31, a first carding unit 10 for producing, in particular carding 101, the first layer 1 is provided.

The second region 32*a* comprises a pre-bonding unit 11, a headbox 12 with a rotating or static turbulence generator, and a compression unit 13. The pre-bonding unit 11 comprises a first water jet device for pre-bonding 102 the first layer 1. The headbox 12 comprises a cross flow or round flow distributor 23 and a unit providing the short fibers 5 or an aqueous dispersion 5*a* comprising the short fibers 5, such as a storage tank. The headbox 12 is used to apply 103 the second layer 2 to the carded first layer 1. The compression unit 13 comprises a second water jet device for compressing 104 at least the applied second layer 2. Below the pre-bonding unit 11, the headbox 12 and/or the compression unit 13, the screen belt 21 and the water absorption point 20 for at least partially dewatering the second layer 2 applied to the first layer 1 are in turn arranged.

The second carding unit 14 for carding 105 a further first layer 3 is arranged in the third region 33*a*. This additional first layer 3 also comprises long fibers 6, which, however, do not necessarily have to correspond to the long fibers 4 of the first layer 1 produced via the first carding unit 10. This additional first layer 3 results in a three-layer composite nonwoven fabric in which the outer flat sides are each formed by a first layer 1, 3 and the second layer 2 is arranged between the two first layers.

A bonding unit 16, in particular a hydroentanglement device for hydroentanglement 107 of the three layers 1, 2, 3, is in turn arranged in the fourth region 34*a*. Hydroentanglement 107 takes place in particular on the two outer flat sides of the fabric 7. The fabric 7 runs around a first drum 24 and a second drum 25 therefor. A forming unit 17 is also arranged in the third region 34, in particular a further hydroentanglement device for one-sided forming or embossing 108 of the fabric 7. A third drum 26 is provided therefor.

In the fifth region 35*a*, the fabric 7 is dried 109 via a drying drum 18 and the fabric 7 is rolled up 110 onto a winding roll 19.

Figure 8:
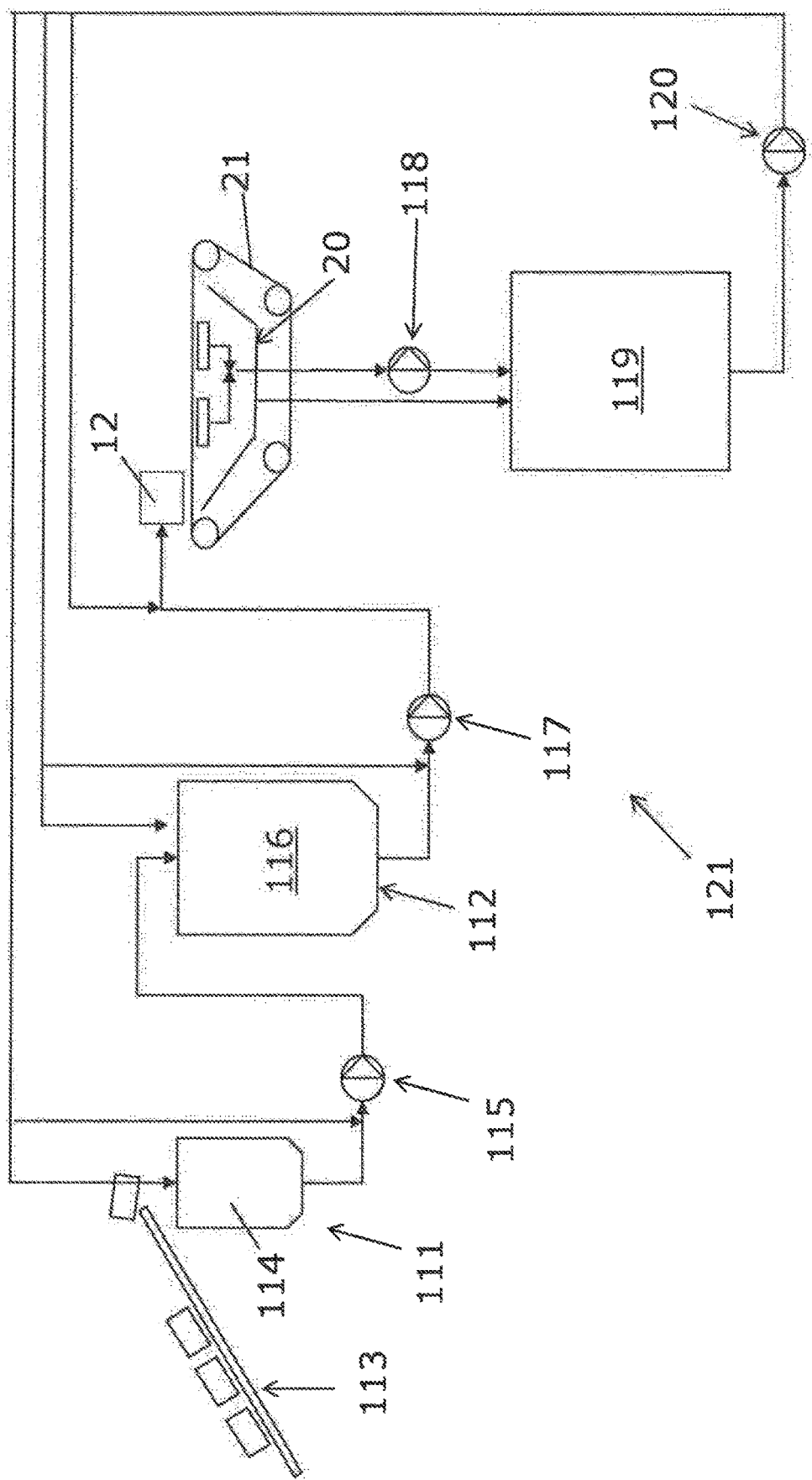
FIG. 8 shows a supply system for one of the aforementioned devices.
Figure 9:
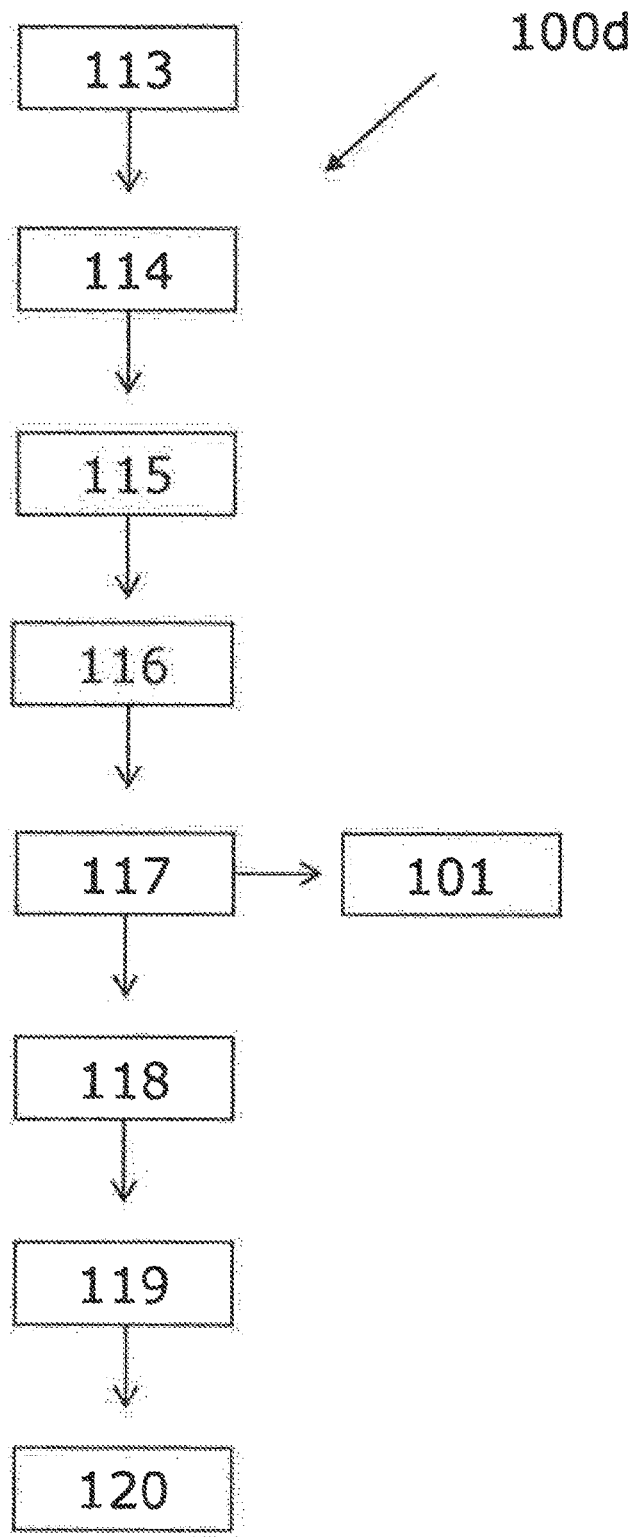
FIG. 9 shows a flowchart of the system according to FIG. 8.

FIG. 8 shows an example of a supply system 121, in particular a water management system, with which the embodiment of a method 100*d* shown in FIG. 9 can be carried out.

The supply system 121 addresses the provision of an aqueous dispersion 5*a* comprising the short fibers 5 for the headbox 12 and the provision, use and recycling of water provided in the aforementioned context.

To produce the aqueous dispersion 5a, a bundle conveyor 113 is first used to convey short fibers 5 to a dispersing unit 114 for dispersing 111 to take place therein. The resulting cleansed mass is supplied to a mixer and/or container 116 for storage 112 via a pump 115. It is made available to the headbox 12 by a pump 117 pumping the aqueous dispersion 5a out of the mixer and/or container 116. After an application 103 of the aqueous dispersion 5a via the roll 23 to the first layer 1, water can be removed from the second layer 2 that has arisen through the screen belt 21 and the water absorption point 20 underneath. An active pumping out or suction can in particular take place via pump 118 on the underside of the first screen belt 21. As a result, liquid can be withdrawn from the second layer 2 in a particularly effective manner. The water obtained via the water absorption point 20 is supplied to a water tank 119. From this water tank 119, water can be pumped via pump 120 to the headbox 12, the container 116, a delivery line for pumping 117 the aqueous dispersion 5a from the container 116 and/or a delivery line for pumping via pump 115 the pulpy mass from the dispersing unit 114. The last two options are in particular used to avoid blockages in pumps 115, 117. This water cycle allows particularly efficient and cost-effective operation of the apparatus.

It should be clear that the scope of protection of the present invention is not limited to the embodiments described. Components of one example can in particular also be implemented in another example. The structure and arrangement of the production line in the regions upstream and downstream of the headbox with rotating or static turbulence generator can in particular be modified without changing the core of the present invention. Reference should also be had to the appended claims.

LIST OF REFERENCE NUMERALS

1 First layer
2 Second layer
3 First layer
4 Long fibers
5 Short fibers
5a Aqueous dispersion
6 Long fibers
7 Fabric
8 Conveying direction
9 Production line
10 First carding unit
11 Pre-bonding unit/First water jet device
12 Headbox
13 Compression unit/Second water jet device
14 Second carding unit
15 Bonding unit/First hydroentanglement device
16 Bonding unit/Second hydroentanglement device
17 Forming unit/Third hydroentanglement device
18 Drying drum
19 Winding roll
20 Water absorption point
21 First screen belt
22 Second screen belt
23 Cross flow or round flow distributor
24 First drum
25 Second drum
26 Third drum
27 Conveyor
30a Device
30b Device
30c Device
30d Device
31 First region
32 Second region
33a Third region
34 Third region
34a Fourth region
35 Fourth region
35a Fifth region
100a Method
100b Method
100c Method
100d Method
101 Carding
102 Pre-bonding
103 Application/Wet laying
104 Compressing
105 Carding
106 Hydroentanglement
107 Hydroentanglement
108 Hydroentanglement
109 Drying
110 Rolling up
111 Dispersing
112 Storage
113 Bundle conveyor
114 Dispersing unit
115 Pump
116 Mixer and/or container
117 Pump
118 Pump
119 Water tank
120 Pump
121 Supply system

What is claimed is:

1. A method for producing a composite nonwoven fabric having at least two layers, wherein a first layer is made of long fibers, and a second layer is made of short fibers, the method comprising:

applying, in a production line, the short fibers of the second layer to the long fibers of the first layer in a wet laid process via a headbox comprising a round flow or cross flow distributor, wherein the round flow or cross flow distributor comprises a rotating or static turbulence generator so as to provide the composite nonwoven fabric having the at least two layers;

compressing at least one of the first layer and the second layer with a water jet device downstream of the headbox in the conveying direction; and performing a first hydroentangling of the short fibers of the second layer with at least one of with one another and with the long fibers of the first layer via a first hydroentanglement device, wherein, each of the applying, the compressing, and the first hydroentangling is performed on a same screen belt.

2. The method as recited in claim 1, wherein,
the headbox further comprises a gap, and
the short fibers pass through the gap in the headbox during the wet laid process.

3. The method as recited in claim 1, wherein prior to the applying, the method further comprises:

producing the first layer,
via an unwinding of a nonwoven fabric,
via a carding,
via a spunbond process, or via a meltblown process, and/or
via a pre-bonding of the first layer.

4. The method as recited in claim 1, wherein prior to the applying, the method further comprises:
dispersing the short fibers so as to form an aqueous dispersion.

5. The method as recited in claim 1, further comprising:
drying the composite nonwoven fabric; and then
rolling up the composite nonwoven fabric.

6. The method as recited in claim 1, wherein,
the first layer forms a bottom layer and the second layer forms a top layer, or
the second layer forms a middle layer and the first layer forms both the top layer and the bottom layer.

7. The method as recited in claim 1, wherein,
the long fibers are selected from artificial and/or synthetic fibers as such or as a mixture thereof, or
the long fibers are selected from the natural fibers of cotton, hemp, flax, jute or bamboo as such or as a mixture thereof, wherein the mixture can include the artificial and/or synthetic fibers, or
the long fibers are selected from biopolymers as such or as a mixture thereof, wherein the mixture can also include the artificial and/or synthetic fibers and/or the natural fibers.

8. The method as recited in claim 1, wherein a concentration of the short fibers in the headbox is between 0.5 and 10 g/l.

9. The method as recited in claim 1, further comprising:
pre-bonding the first layer prior to the applying via the wet laid process,
wherein,
each of the pre-bonding, the applying, the compressing, and the first hydroentangling is performed on the same screen belt.

10. The method as recited in claim 1, wherein,
the applying of the short fibers of the second layer to the long fibers of the first layer in the wet laid process via the headbox provides an initial hydrodynamic bonding, and
prior to the at least two layers being transferred to any additional method steps, the method further comprises:
at least one of carding and pre-bonding of the first layer; and
hydrating and fixing the first layer on the same screen belt.

11. The method as recited in claim 1, further comprising:
pre-bonding the first layer prior to the applying via the wet laid process; and
performing a second hydroentangling of the at least two layers,
wherein,
each of the pre-bonding, the applying, the compressing, and the first hydroentangling is performed on the same screen belt, and
the second hydroentangling is performed when the at least two layers lie against a drum.

12. The method as recited in claim 1, wherein the wet laid process is configured to be performed at least one of,
between a height level of the same screen belt and a height level of up to 150 mm above the same screen belt, and
at a delivery angle of −20° to +20° to a direction perpendicular to a surface of the same screen belt.

13. The method as recited in claim 1, wherein,
the first layer is produced via a carding process, and
the first layer consists of or comprises bicomponent fibers.

14. The method as recited in claim 13, wherein the carding process comprises a through air bonding step where the long fibers of the first layer are subjected to heated air before the short fibers of the second layer are attached to the first layer.

15. The method as recited in claim 1, further comprising:
applying a second first layer to the second layer via a carding process.

16. The method as recited in claim 1, wherein at least one of the first layer and the second layer is made from a plurality of layers which are applied one on top of the other.

17. A device for producing a composite nonwoven fabric having at least two layers, wherein a first layer is made of long fibers and a second layer is made of short fibers, the device comprising a production line which comprises:
at least one conveyor which is configured to transport at least the first layer in a conveying direction, the at least one conveyor comprising a first screen belt;
a headbox which is arranged above the at least one conveyor, the headbox comprising a round flow or cross flow distributor, wherein the round flow or cross flow distributor comprises a rotating or static turbulence generator for applying the short fibers to the first layer so as to produce the second layer;
a first water jet device which is configured to compress at least one of the first layer and the second layer downstream of the headbox; and
a first hydroentanglement device which is configured to entangle the short fibers of the second layer with one another downstream of the headbox,
wherein,
a portion of the first screen belt extends below each of the headbox, the first water jet device, and the first hydroentanglement device.

18. The device as recited in claim 17, further comprising:
a carding unit for producing the first layer, the carding unit being arranged upstream of the headbox in the conveying direction.

19. The device as recited in claim 17, wherein the headbox is at least one of arranged and designed so that a wet laid process is performed at least one of,
between a height level of the first screen belt and a height level of up to 150 mm above the first screen belt, and
at a delivery angle of −20° to +20° to a direction perpendicular to a surface of the first screen belt.

20. The device as recited in claim 17, further comprising at least one of,
a second water jet device which is configured to compact at least one of the first layer and the second layer downstream of the headbox in the conveying direction; and
a second hydroentanglement device which is configured to entangle the short fibers of the second layer with the long fibers of the first layer.

21. The device as recited in claim 17, wherein the at least one conveyor further comprises
a second screen belt.

22. The device as recited in claim 18, further comprising in the production direction:
an additional carding unit, the additional carding unit being arranged downstream of the headbox in the conveying direction.

23. A method for producing a composite nonwoven fabric having at least two layers, wherein a first layer is made of long fibers, and a second layer is made of short fibers, the method comprising:
applying, in a production line, the short fibers of the second layer to the long fibers of the first layer in a wet laid process via a headbox comprising a round flow or cross flow distributor, wherein the round flow or cross flow distributor comprises a rotating or static turbulence generator so as to provide the composite nonwoven fabric having the at least two layers;

compressing at least one of the first layer and the second layer downstream of the headbox in the conveying direction via a compression unit; and after the compressing, performing a first hydroentangling of the short fibers of the second layer with at least one of with one another and with the long fibers of the first layer via a first hydroentanglement device, wherein, each of the applying, the compressing, and the first hydroentangling is performed on a same screen belt.

24. A method for producing a composite nonwoven fabric having at least two layers, wherein a first layer is made of long fibers, and a second layer is made of short fibers, the method comprising:

applying, in a production line, the short fibers of the second layer to the long fibers of the first layer in a wet laid process via a headbox comprising a round flow or cross flow distributor, wherein the round flow or cross flow distributor comprises a rotating or static turbulence generator so as to provide the composite nonwoven fabric having the at least two layers;

compressing at least one of the first layer and the second layer with a water jet device downstream of the headbox in the conveying direction; and after the compressing, performing a first hydroentangling of the short fibers of the second layer with at least one of with one another and with the long fibers of the first layer via a first hydroentanglement device, wherein, each of the applying, the compressing, and the first hydroentangling is performed on a same screen belt.

* * * * *